US010055162B2

(12) United States Patent
Jannen et al.

(10) Patent No.: US 10,055,162 B2
(45) Date of Patent: Aug. 21, 2018

(54) USING A TREE-BASED DATA STRUCTURE TO MAP LOGICAL ADDRESSES TO PHYSICAL ADDRESSES ON A STORAGE DEVICE

(71) Applicant: NetApp, Inc., Sunnyvale, CA (US)

(72) Inventors: William Karl Jannen, Jackson Heights, NY (US); Peter Macko, Watertown, MA (US); Stephen Michael Byan, Littleton, MA (US); James F. Lentini, Woburn, MA (US); Keith Arnold Smith, Waltham, MA (US)

(73) Assignee: NetApp, Inc., Sunnyvale, CA (US)

( * ) Notice: Subject to any disclaimer, the term of this patent is extended or adjusted under 35 U.S.C. 154(b) by 276 days.

(21) Appl. No.: 14/928,594

(22) Filed: Oct. 30, 2015

(65) Prior Publication Data

US 2017/0123665 A1    May 4, 2017

(51) Int. Cl.
   *G06F 3/06* (2006.01)

(52) U.S. Cl.
   CPC .............. *G06F 3/064* (2013.01); *G06F 3/061* (2013.01); *G06F 3/0676* (2013.01)

(58) Field of Classification Search
   CPC ............. G06F 12/0253; G06F 12/0261; G06F 12/0269; G06F 12/0276; G06F 12/0292; G06F 12/10; G06F 3/061; G06F 3/064; G06F 3/0676
   See application file for complete search history.

(56) References Cited

U.S. PATENT DOCUMENTS

| | | | | |
|---|---|---|---|---|
| 2006/0224843 A1* | 10/2006 | Rao | ....................... | G06F 3/0607 711/161 |
| 2010/0100667 A1* | 4/2010 | Kang | .................. | G06F 12/0246 711/103 |
| 2013/0073830 A1* | 3/2013 | Gandhi | ................. | G06F 12/023 711/170 |
| 2014/0208004 A1* | 7/2014 | Cohen | ................. | G06F 12/0246 711/103 |
| 2014/0223089 A1* | 8/2014 | Kang | .................. | G06F 12/0246 711/103 |

* cited by examiner

*Primary Examiner* — Yaima Rigol
(74) *Attorney, Agent, or Firm* — Gilliam IP PLLC

(57) ABSTRACT

A write request is received to write a data block having a logical block address to a nonvolatile storage device. The method includes writing a value of the data block to the nonvolatile storage device. The writing includes locating a position in a tree-based data structure that includes first and second nodes. The first node is configured to store a first set of data blocks having logical block addresses in a first numerical range, and the second node is configured to store a second set of data blocks having logical block addresses in a second numerical range. The position is located in the first node or the second node depending on the value of the logical block address. The writing includes storing the value of the data block in the position in the tree-based data structure.

20 Claims, 16 Drawing Sheets

USING A TREE-BASED DATA STRUCTURE TO MAP LOGICAL ADDRESSES TO PHYSICAL ADDRESSES ON A STORAGE DEVICE

BACKGROUND

The disclosure generally relates to the field of data storage, and more particularly to using a tree-based data structure to map logical block addresses to physical block addresses on a storage device.

An increasing amount of data is being stored. Although the per unit cost associated with storing data has declined over time, the total costs for storage has increased for many corporate entities because of the increase in volume of stored data.

In response, manufacturers of data storage drives (e.g., magnetic hard disk drive) have increased data storage capacity by using various techniques, including increasing the number of platters and the density of tracks and sectors on one or both surfaces of the platters. A platter is commonly a circular disk having one or both sides of a rigid substrate coated with a magnetic medium, on which data is stored. Data storage devices typically have several platters that are mounted on a common spindle. Each side on which data is stored commonly has an associated read head and a write head, or sometimes a combined read/write head. The platters are rotated rapidly within the data storage device about the spindle, and an actuator moves heads toward or away from the spindle so that data can be written to or read from tracks. A track is a circular path on the magnetic surface of the platters. One way of increasing data storage capacity is to have very narrow tracks and to place heads very close to the surface of the platter, e.g., micrometers (also, "microns") away. However, because it takes more energy to write data than to read data (e.g., because the magnetic surface of platters must be magnetized to store data), data storage drive manufacturers inserted a buffer track between tracks storing data so that a wider track can be written to than read from. The buffer tracks could be magnetized when tracks on either side of the buffer tracks ("data tracks") were written to, but read heads would only read from data tracks and ignore buffer tracks. However, buffer tracks decrease available space on platters.

To avoid wasting space on buffer tracks, a technique employed by the industry is shingled magnetic recording ("SMR"). SMR is a technique to increase capacity used in hard disk drive magnetic storage. Although conventional data storage devices as described above record data by writing non-overlapping magnetic tracks parallel to each other, SMR involves writing new tracks that overlap part of the previously written magnetic track, leaving the previously written magnetic track thinner, thereby allowing for higher track density. The SMR tracks partially overlap in a manner similar to roof shingles on a house.

For SMR drives, a disk can include a number of concentric, overlapping tracks on which data is stored on the surface. A number of zones can be defined on a disk, wherein each zone can include a group of tracks. Generally, data is written to sequential physical blocks within a zone (e.g., physical blocks that have monotonically increasing Physical Block Addresses (PBAs)). Once data has been written to a particular physical block within a zone, that physical block is not modified unless the previous physical blocks within the zone are rewritten as well. Thus, to modify the data stored at a particular physical block, data from the entire zone is read from the disk, the data for the appropriate physical block is modified, and the entire zone is written back to the disk (referred to as a "read-modify-write operation").

Update-in-place filesystems may use static mappings between Logical Block Addresses (LBAs) and PBAs. Thus, when a component (e.g., higher level software) writes data to a particular LBA, the LBA is mapped to a particular PBA and the data stored at that PBA is modified. Because read-modify-write operations are used to modify data stored at particular PBAs, each update to an LBA of an update-in-place filesystem may result in a read-modify-write operation being performed, potentially causing significant performance degradation.

SUMMARY

In some embodiments, a method includes receiving a first write request to write a first data block to a nonvolatile storage device, wherein the first data block is associated with a first logical block address. The method also includes writing a value of the first data block to the nonvolatile storage device. The writing includes locating a first position in a tree-based data structure having a number of nodes that includes a first node and a second node. The first node is configured to store a first set of data blocks having logical block addresses in a first numerical range, and the second node is configured to store a second set of data blocks having logical block addresses in a second numerical range. The locating of the first position includes locating the first position in the first node, in response to the first logical block address being in the first numerical range. The locating of the first position includes locating the first position in the second node, in response to the first logical block address being in the second numerical range. The writing also includes storing the value of the first data block in the first position in the tree-based data structure.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody embodiments of the disclosure. However, it is understood that this disclosure may be practiced without these specific details. For instance, this disclosure refers to SMR drives in illustrative examples. But aspects of this disclosure can be applied to other types of data storage devices. In other instances, well-known instruction instances, protocols, structures and techniques have not been shown in detail in order to clarify the description.

Overview

Some embodiments of a storage system incorporate an on-disk, sequentially ordered data structure for reads and writes to a nonvolatile storage device (e.g., an SMR drive). For example, the on-disk, sequentially ordered data structure can be a $B^\varepsilon$ tree, a Log-Structured Merge (LSM) tree, Cache Oblivious Look Ahead arrays (COLAs), etc. The sequentially ordered data structure can be a key-value mapping, wherein the keys are LBAs and the values are the physical data block being stored. Thus, the data itself along with the associated LBAs are stored in the data structure. Data can be physically sorted by LBA, thereby increasing performance of sequential reads even on randomly written data because of the sequential ordering based on the LBAs provided by the data structure. Thus, some embodiments convert random Input/Output (I/O) workloads into large, sequential I/Os for accessing on the data storage device.

Example System

Figure 1:
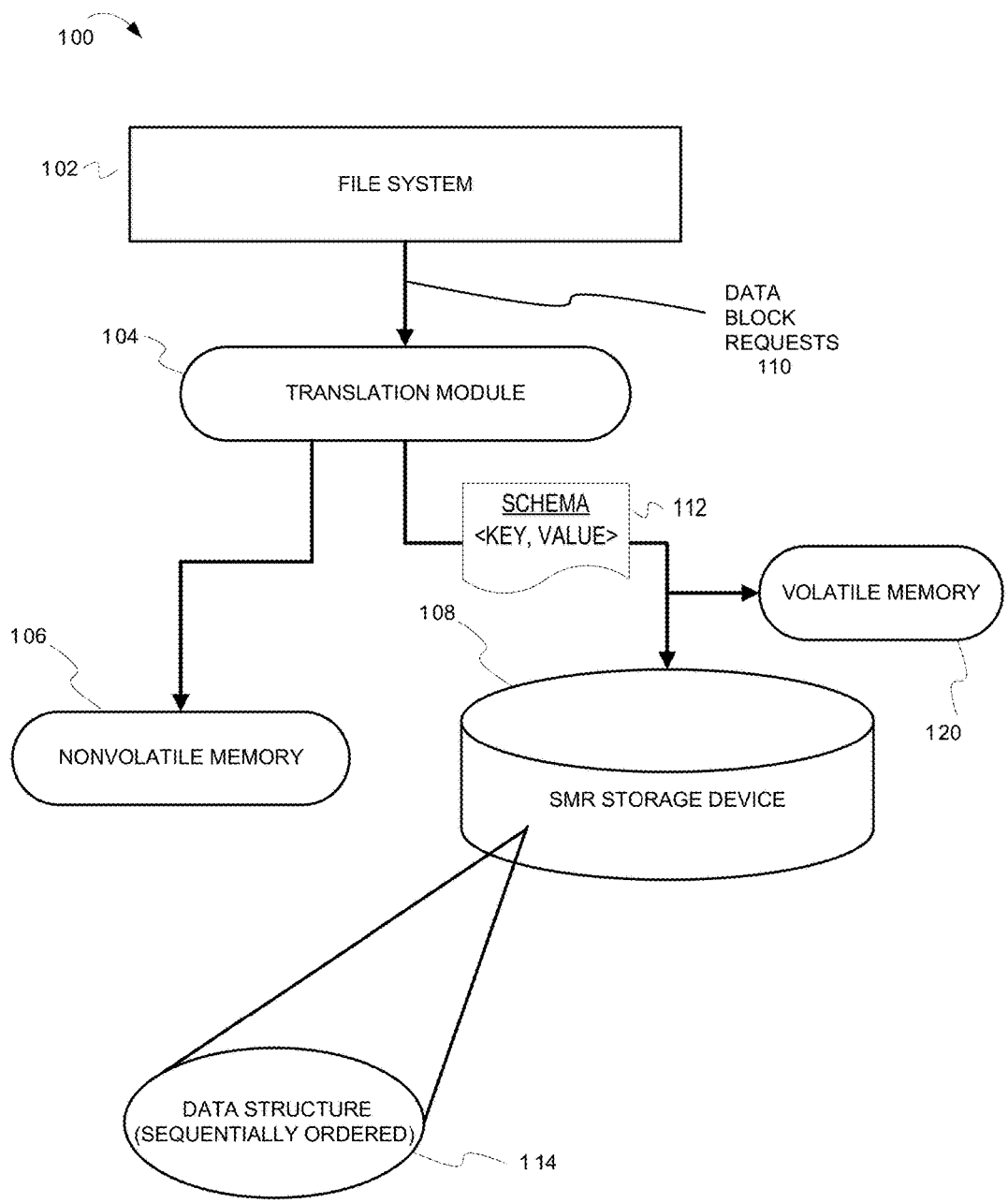
FIG. 1 depicts a system for sequenced ordered translation for data storage, according to some embodiments.

FIG. 1 depicts a system for sequenced ordered translation for data storage, according to some embodiments. A system 100 includes a filesystem 102 coupled with a translation module 104. The translation module 104 is coupled with a nonvolatile memory 106, a volatile memory 120, and an SMR storage device 108. The SMR storage device 108 is configured to store a data structure 114. In some embodiments, the data structure 114 is a structure that provides for sequential ordering of data blocks stored therein based on their associated LBAs. For example, the data structure 114 can be a $B^\varepsilon$ tree, a Log-Structured Merge (LSM) tree, Cache Oblivious Look Ahead arrays (COLAs), etc. The nonvolatile memory 106 can be a FLASH memory, a conventional disk drive, or a zone in the SMR storage device 108.

Examples of the data structure 114 as a $B^\varepsilon$ tree are further described below. In some embodiments for a $B^\varepsilon$ tree, the block size is four megabytes with a fanout of 16. The data blocks written to the SMR storage device 108 can be stored in the data structure 114 based on a sequential ordering according to the LBAs of the data blocks. Similarly, the data blocks read from the SMR storage device 108 can be retrieved from the data structure 114 based on the sequential ordering using the LBAs. The SMR storage device 108 can be a magnetic storage based hard disk drive that incorporates SMR technology. In particular, the SMR storage device 108 can record data by writing tracks such that new tracks overlap at least a part of a previously written track. These shingled writes result in the previously written track being narrower but allowing for higher track density. While described as an SMR-based magnetic storage device, the SMR storage device 108 can also include other types of storage devices. For example, the SMR storage device 108 can be a nonvolatile FLASH device. Alternatively or in addition, the SMR storage device 108 may not be limited to SMR-based writes. For example, some embodiments may be incorporated into any other storage devices configured to store on-disk data structures to provide for sequential ordering of data blocks stored therein based on the associated LBAs of the data blocks (further described below).

The data structure 114 can be an on-disk data structure. An on-disk data structure can be defined as a data structure in which at least a part of the data structure is stored in a nonvolatile storage device (e.g., SMR storage device 108). Also, an on-disk data structure can be defined such that the data to be stored in the nonvolatile storage device is stored within the data structure itself. The data structure can be defined as being sequentially ordered. For example, the data structure 114 can be a tree-based data structure that includes a number of nodes (e.g., root, non-leaf, and leaf). The data stored in each node can be sequentially ordered (e.g., ascension order) based on their associated LBAs. This sequential ordering is depicted in FIGS. 3-15, which are further described below.

The filesystem 102 and the translation module 104 can be software, hardware, firmware, or a combination thereof. The filesystem 102 can be a module used to control reads and writes of data from the SMR storage device 108. The translation module 104 can translate accesses received from the filesystem 102 for data blocks stored in the SMR storage device 108. In this example, the filesystem 102 transmits data block requests 110 to the translation module 104. The translation module 104 can translate the data block requests 110 to access data blocks to be written or read from the SMR storage device 108.

The data block requests 110 can be a write, read, or trim request of data stored in the SMR storage device 108. The translation module 104 remaps or translates the data block requests 110 into a schema 112. The schema 112 includes a <key, value> pair. The key is the LBA for the data block, and the value is the actual data being stored. For example, a write request can be an insert request of data to be written at the LBA:

WRITE: insert (LBA, data [4096])

An example of a read request can include a search request in which the data value is set to the data read from the key (the LBA):

READ: data value=search(LBA)

Another example of a read request can include a successor request in which the data value is set to the value read from the successive or next data block relative to the LBA:

READ: data value=successor(LBA)

Another example request can be a trim operation in which an insert request of a deletion record is to be written at the LBA:

TRIM: insert (LBA, DELETE RECORD)

Accordingly, using the <key, value> pair in the schema 112, the translation module 104 can traverse the data structure 112 to read or write data therein. An example of traversal and write (insert) to the data structure 112 (represented as a $B^\varepsilon$ tree) is depicted in FIGS. 3-9, which are described in more detail below. An example of traversal and read (search) from the data structure 112 (represented as a $B^\varepsilon$ tree) is depicted in FIGS. 10-14, which are also described in more detail below. Although denoted as being stored in the SMR storage device 108, at least a part of the data structure 112 (a node of the $B^\varepsilon$ tree) can reside at least temporarily in the volatile memory 120. For example, assume a node in the $B^\varepsilon$ tree can be stored in the volatile memory 120 during a write of a data block in the node. Thus, the translation module 104 can access data stored in this part of the data structure 112 from the volatile memory 120 rather than from the SMR storage device 108. In some embodiments, the nonvolatile memory 106 can also be used to store metadata for the tree and/or even a part of the tree. The nonvolatile memory 106 can store log data related to creating, modifying, etc. of the data structure 112.

FIG. 1 depicts a system that includes the filesystem 102. In some other embodiments, a system can be independent of the filesystem 102. For example, the data block requests 110 can be provided from a different module.

Figure 2:
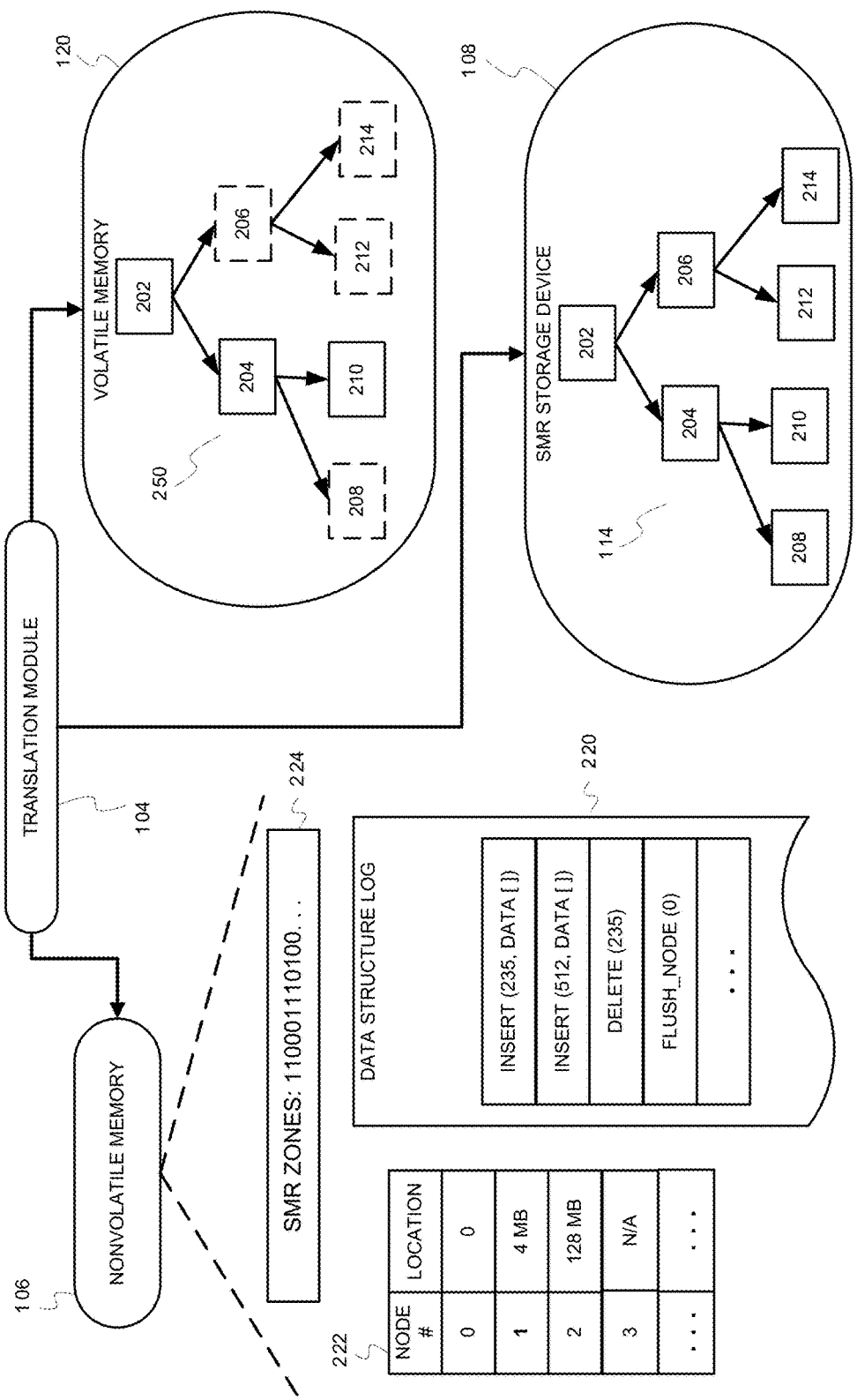
FIG. 2 depicts a more detailed diagram of a part of the system depicted in FIG. 1, according to some embodiments.

FIG. 2 depicts a part of the system 100 to help illustrate the volatile memory 120 and the nonvolatile memory 106. In particular, FIG. 2 depicts a more detailed diagram of a part of the system depicted in FIG. 1, according to some embodiments. Similar to FIG. 1, FIG. 2 depicts the translation module 104 coupled with the nonvolatile memory 106, the volatile memory 120, and the SMR storage device 108 (storing the data structure 114). In FIG. 2, the volatile memory 120 acts as a cache for the data structure 114. In this example, the data structure 114 is a tree-based data structure. The data structure 114 includes a root node 202 having two child nodes (a non-leaf node 204 and a non-leaf node 206). The non-leaf node 204 has two child nodes (a leaf node 208 and a leaf node 210). The non-leaf node 206 has two child nodes (a leaf node 212 and a leaf node 214). A portion of the data structure 114 (referenced as the data structure 250) also resides in the volatile memory 120. As shown, the root node 202, the non-leaf node 204, and the leaf node 210 of the data structure 250 reside in the data structure 250 within the volatile memory 120. However, because of the size of the data structure 112 can be greater than the size of the volatile memory 120, only some of the nodes of the data structure 112 may be stored in the volatile memory 120. Therefore, in this example, the non-leaf node 206, the leaf node 208, the leaf node 212, and the leaf node 214 have been evicted from the volatile memory 120 for storage in the SMR storage device 108. In some embodiments, the nodes that have been accessed (read or write) least recently are moved from the volatile memory 120 for storage in the SMR storage device 108. Thus, the nodes that have been accessed least recently are removed from the volatile memory 120. If a node has changed since the last time it was written to the SMR storage device 108, the node will first be written to the SMR storage device 108 before being removed from the volatile memory 120.

The nonvolatile memory 106 is configured to store a data structure log 220, a node translation table 222, and a zone map 224. The translation module 104 can update the data structure log 220, the node translation table 222, and the zone map 224 as the data structure 114 and the zones in the SMR storage device 108 change over time. The data structure 220, the node translation table 222, and the zone map 224 are stored in a nonvolatile memory in cases where a system crash occurs prior to changes to the data structure 220 being recorded to the data structure 114 in the SMR storage device 108. In other words, the translation module 104 can use the data structure log 220, the node translation table 222, and the zone map 224 to update the data structure 114 in the SMR storage device 108 based on any changes made in the data structure 220 in the volatile memory 120.

The node translation table 222 maps logical node numbers for nodes in the data structure 114 to physical offsets on the SMR storage device 108. The physical offset can be a value that uniquely identifies the location in the SMR storage device or a zone number and an offset within the zone. The zone map 224 comprises a bitmap that shows that a node is either alive or marked for garbage collection. The data structure log 220 includes a recordation of the changes to the data structure 114. For example, the translation module 104 can create an entry in the data structure log 220 when data is inserted into the data structure 114 (e.g., insert (235, data [ ]), when data is deleted from the data structure (e.g., delete (235)), when data in a node is flushed to lower nodes in the data structure 112 (e.g., flush_node(0)), etc. As further described below, the translation module 104 can traverse and access (read or write) data in the nodes of the data structure 114 using key (the LBA for the data to be accessed), value (value of data) pairs.

The data structure 114 can be stored across one or more zones in the SMR storage device 108. For example, different nodes can be stored in different zones. Alternatively or in addition, multiple nodes can be stored in a same zone. If a node of the data structure is accessed, a copy of the node can be copied into the volatile memory 120. SMR drives are configured such that update-in-place operations are not allowed (i.e., updates to particular data blocks require a read-write-modify-write operation instead of a write operation). Therefore, if data is added to an existing node or if data is rearranged in an existing node to provide for sequential ordering based on LBAs, the translation module 104 can copy the node from a zone in the SMR storage device 108 to the volatile memory 120. The translation module 104 can then perform an update to the existing node and then store the updated node to a different location in the SMR storage device 108. For example, the translation module 104 can append the updated node to the end of a same or different zone in the SMR storage device 108 that is currently open for writes therein. In some embodiments, the updated node may not be written immediately to a zone in the SMR storage device 108. Rather, the updated node may be written to a zone in the SMR storage device 108 in accordance with an eviction policy for the volatile memory 120. For example, the update node can be written to a zone in the SMR storage device 108 if space is needed in the volatile memory 120 to write new data therein. Also, the translation module 104 can mark the location wherein the existing node was stored in the SMR storage device 108 for garbage collection. Accordingly, this space occupied by the existing node in one of the zones of the SMR storage device 108 can be reclaimed for reuse during garbage collection.

Operations described herein for accessing a nonvolatile storage device are described as being performed on host-managed SMR drives. Host-managed SMR drives expose drive characteristics and cede control, at least partially, to the operating system executing on the host device. For host-managed SMR drives, the burden of SMR enforcement is moved from the SMR drives to the host's operating system. Therefore, with reference to FIG. 1, the translation module 104 can be part of the host's operating system.

However, such operations are not limited to being performed on host-managed SMR drives. For example, the operations can be performed in a drive-managed SMR drive. In the drive-managed SMR drive configuration, the operations can be performed in the firmware of the SMR drives. Drive-managed SMR drives can maintain comparability with existing block interfaces and appear externally as a traditional hard disk drive to the filesystems. The operations described herein can also be performed on host-aware SMR drives. In the host-aware SMR drive configuration, physical drive characteristics can be exposed to the host device so that the host device can optimize performance. However, the host-aware SMR drives would include firmware (similar to drive-managed SMR drives) to enforce correctness when receiving block requests that do not conform to SMR restrictions.

Example Write/Insert Operations

Figure 3:
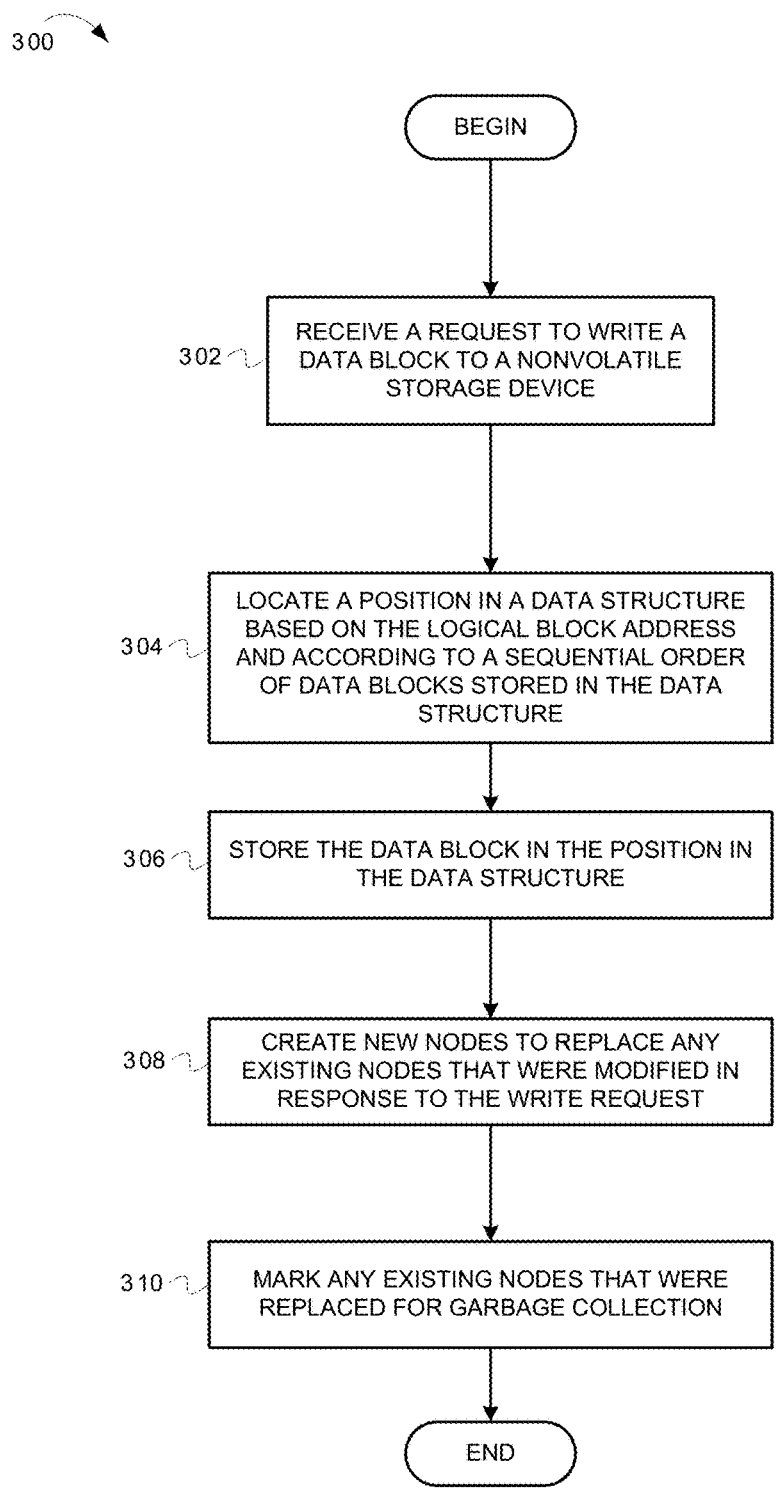
FIG. 3 depicts a flowchart for a sequenced ordered translation to write a data block to a nonvolatile storage device, according to some embodiments.

FIG. 3 depicts a flowchart for a sequenced ordered translation to write a data block to a nonvolatile storage device, according to some embodiments. A flowchart 300 of FIG. 3 is described in reference to the on-disk data structure changing over time depicted in FIGS. 4-10. The operations of the flowchart 300 can be performed by software, firmware, hardware or a combination thereof (see for example the translation module 104 in FIGS. 1-2). The operations of the flowchart 300 start at block 302.

At block 302, a request to write a data block to a nonvolatile storage device is received. With reference to FIG. 1, the translation module 104 can receive a data block request 110 from the filesystem 102. The write request can include the LBA where data is to be written and the value to be written. The write request can also include a range of LBAs and corresponding data blocks to allow for a write of multiple data blocks over a range of LBAs. Operations of the flowchart 300 continue at block 304.

At block 304, a position in the data structure is located for writing the data block based on the LBA and according to a sequential order of the data blocks already stored in the data structure. With reference to FIG. 1, the translation module 104 can locate the position in the data structure 114. FIGS. 4-10 (which are described below) include an on-disk data structure that changes over time to help illustrate this locating of the position in the data structure 114. Operations of the flowchart 300 continue at block 306.

Figure 10:
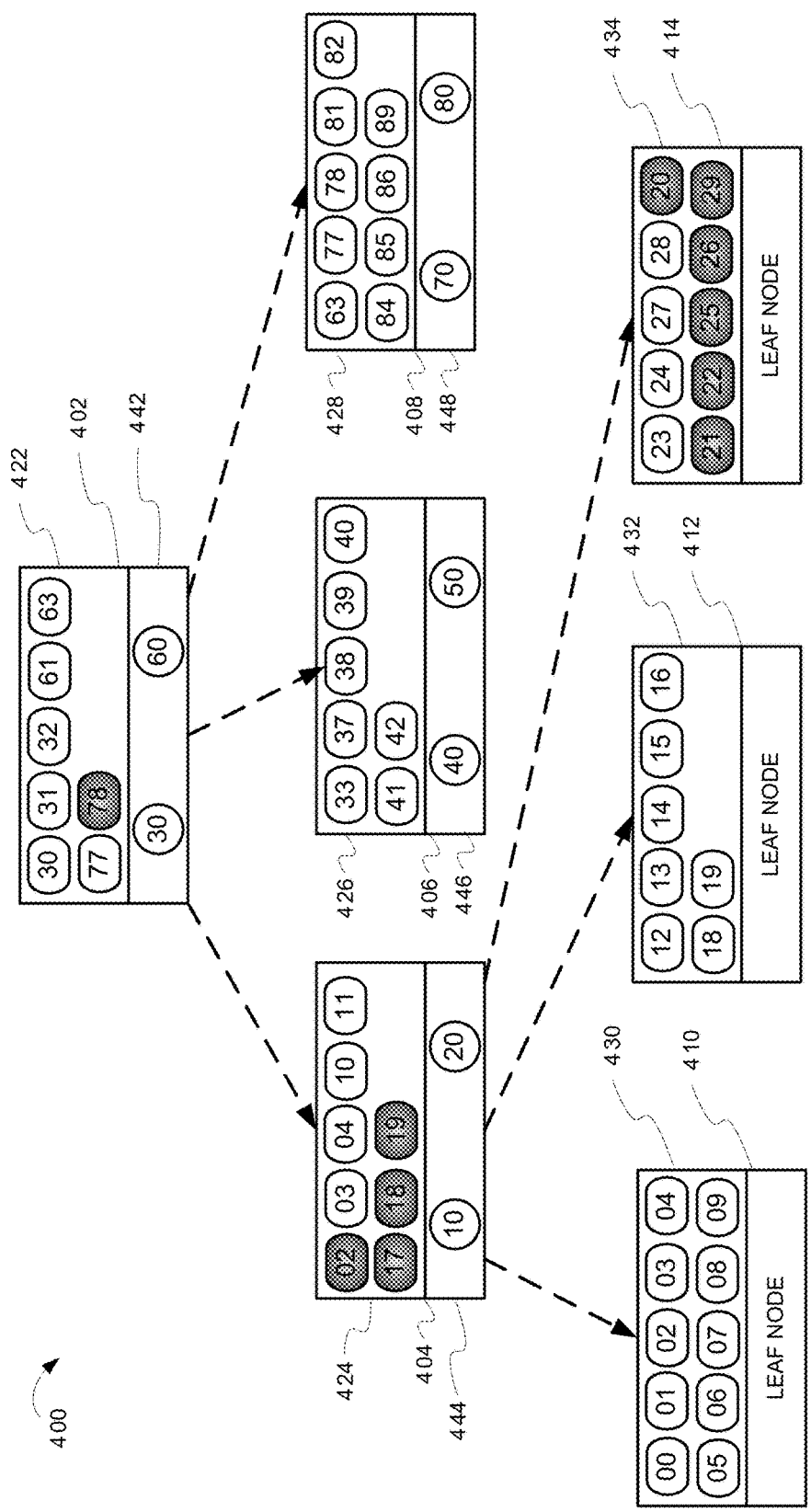

At block 306, the data block is stored in the position in the data structure. With reference to FIG. 1, the translation module 104 can store the data block in the data structure 114. FIG. 10 (which is described below) help illustrate this storing of the data block in the data structure 114. Operations of the flowchart 300 continue at block 308.

At block 308, new nodes are created for any existing nodes that were modified in response to the write request. With reference to FIG. 1, the translation module 104 can perform this operation. In particular, because update-in-place operations may not be allowed for SMR drives, for any nodes that are modified, the translation module 104 can copy the existing node to the volatile memory 120. The translation module 104 can then perform an update to the existing node and then store the updated node in a different location in the SMR storage device 108. For example, the translation module 104 can append the updated node to the end of a same or different zone in the SMR storage device 108 that is currently open for writes therein. The storage of the updated node to a zone in the SMR storage device 108 may not be immediate. For example, the updated node may be created and remain in the volatile memory 120 until other data loaded into the volatile memory 120 causes the updated node to be written to the SMR storage device 108. Operations of the flowchart 300 continue at block 310.

At block 310, any existing nodes that were replaced in response to the write operation are marked for garbage collection. With reference to FIG. 1, the translation module 104 can perform this operation. For example, the translation module 104 can mark the location wherein the existing node was stored in the SMR storage device 108 for garbage collection by flipping the bit in the zone map 224 to mark the node for garbage collection. During garbage collection of this zone, a garbage collection module can then copy this zone to the volatile memory 120. The garbage collection can then create a new zone that does not include the data that was marked for garbage collection. During garbage collection, nodes can be overwritten at different times. Therefore, valid or live nodes (not marked for garbage collection) will be migrated out of partially empty SMR zones into new SMR zones so that the deadspace occupied by dead nodes or data in the old SMR zones can be reused. In some embodiments, the live nodes that are on a same level of the tree data structure can be migrated to a same SMR zone. Accordingly, SMR zone A could store nodes in level 1, SMR zone B could store the nodes in level 2, SMR zone C could store the nodes in level 3, etc. The operations of the flowchart 300 are complete.

Figure 4:
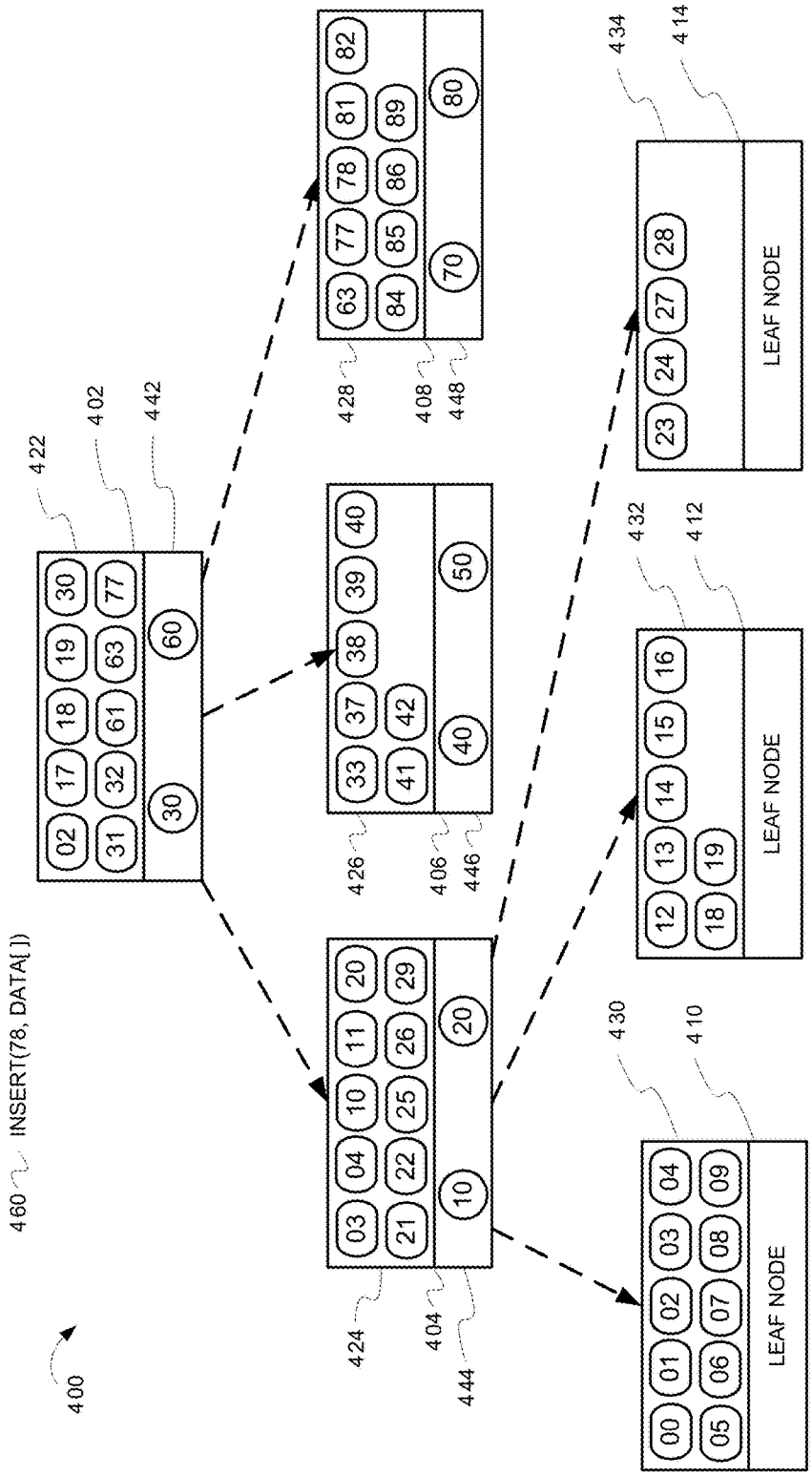
FIGS. 4-10 depict an on-disk data structure changing over time in response to a write of a data block to a nonvolatile storage device, according to some embodiments.

To help illustrate, FIGS. 4-10 depict an on-disk data structure changing over time in response to a write of a data block to a nonvolatile storage device, according to some embodiments. With reference to FIG. 4, the translation module 104 can execute an insert operation 460 to insert a block of data ("data [ ]") at LBA 78. FIG. 4 depicts a data structure 400 that is a $B^\varepsilon$ tree. The data structure 400 includes a root node 402, a non-leaf node 404, a non-leaf node 406, a non-leaf node 408, a leaf node 410, a leaf node 412, and a leaf node 414. Each node includes a data buffer in which a number of data blocks can be stored therein in a sequential order according to their LBAs. In some other embodiments, the data blocks in the data buffer are not in sequential order according to their LBAs. The root node and the non-leaf nodes can also include one or more child pointers to point to children nodes.

The root node 402 includes a data buffer 422 and child pointers 442. The non-leaf node 404 includes a data buffer 424 and child pointers 444. The non-leaf node 406 includes a data buffer 426 and child pointers 446. The non-leaf node 408 includes a data buffer 428 and child pointers 448. The leaf node 410 includes a data buffer 430. The leaf node 412 includes a data buffer 432. The leaf node 414 includes a data buffer 434.

The data buffer 422 of the root node 402 is storing 10 data blocks that are sequentially ordered based on their associated LBAs. A first data block has an LBA of 02. A second data block has an LBA of 17. A third data block has an LBA of 18. A fourth data block has an LBA of 19. A fifth data block has an LBA of 30. A sixth data block has an LBA of 31. A seventh data block has an LBA of 32. An eighth data block has an LBA of 61. A ninth data block has an LBA of 63. A tenth data block has an LBA of 77. The child pointers 442 of the root node 402 include three child pointers. A first child pointer points to the non-leaf node 404 and includes the part of the tree that includes data blocks with LBAs less than 30. A second child pointer points to the non-leaf node 406 and includes the part of the tree having data blocks with LBAs between 30 and 60. A third child pointer points to the non-leaf node 408 and includes the part of the tree having data blocks with LBAs greater than 60.

The data buffer 424 of the non-leaf node 404 is storing 10 data blocks that are sequentially ordered based on their associated LBAs. A first data block has an LBA of 03. A second data block has an LBA of 04. A third data block has an LBA of 10. A fourth data block has an LBA of 11. A fifth data block has an LBA of 20. A sixth data block has an LBA of 21. A seventh data block has an LBA of 22. An eighth data block has an LBA of 25. A ninth data block has an LBA of 26. A tenth data block has an LBA of 29. The child pointers 444 of the non-leaf node 404 include three child pointers. A first child pointer points to the leaf node 410 and includes the part of the tree that includes data blocks with LBAs less than 10. A second child pointer points to the leaf node 412 and includes the part of the tree having data blocks with LBAs between 10 and 20. A third child pointer points to the leaf node 414 and includes the part of the tree having data blocks with LBAs greater than 20.

The data buffer 426 of the non-leaf node 406 is storing seven data blocks that are sequentially ordered based on their associated LBAs. A first data block has an LBA of 33. A second data block has an LBA of 37. A third data block has an LBA of 38. A fourth data block has an LBA of 39. A fifth data block has an LBA of 40. A sixth data block has an LBA of 41. A seventh data block has an LBA of 42. There are currently no active pointers for child pointers 446 of the non-leaf node 406. However, if nodes are added below the non-leaf node 406, the child pointers 446 can include three child pointers. A first child pointer would point to the part of the tree that includes data blocks with LBAs less than 40. A second child pointer would point to the part of the tree that includes data blocks with LBAs between 40 and 50. A third child pointer would point to the part of the tree that includes data blocks with LBAs greater than 50.

The data buffer 428 of the non-leaf node 408 is storing nine data blocks that are sequentially ordered based on their associated LBAs. A first data block has an LBA of 63. A second data block has an LBA of 77. A third data block has an LBA of 78. A fourth data block has an LBA of 81. A fifth data block has an LBA of 82. A sixth data block has an LBA of 84. A seventh data block has an LBA of 85. An eighth data block has an LBA of 86. A ninth data block has an LBA of 89. There are currently no active pointers for child pointers 448 of the non-leaf node 408. However, if nodes are added below the non-leaf node 408, the child pointers 448 can include three child pointers. A first child pointer would point to the part of the tree that includes data blocks with LBAs less than 70. A second child pointer would point to the part of the tree that includes data blocks with LBAs between 70 and 80. A third child pointer would point to the part of the tree that includes data blocks with LBAs greater than 80.

The data buffer 430 of the leaf node 410 is storing 10 data blocks that are sequentially ordered based on their associated LBAs. A first data block has an LBA of 00. A second data block has an LBA of 01. A third data block has an LBA of 02. A fourth data block has an LBA of 03. A fifth data block has an LBA of 04. A sixth data block has an LBA of 05. A seventh data block has an LBA of 06. An eighth data block has an LBA of 07. A ninth data block has an LBA of 08. A tenth data block has an LBA of 09.

The data buffer 432 of the leaf node 412 is storing seven data blocks that are sequentially ordered based on their associated LBAs. A first data block has an LBA of 12. A second data block has an LBA of 13. A third data block has an LBA of 14. A fourth data block has an LBA of 15. A fifth data block has an LBA of 16. A sixth data block has an LBA of 18. A seventh data block has an LBA of 19.

The data buffer 434 of the leaf node 414 is storing four data blocks that are sequentially ordered based on their associated LBAs. A first data block has an LBA of 23. A second data block has an LBA of 24. A third data block has an LBA of 27. A fourth data block has an LBA of 28.

As shown, multiple nodes in the data structure 400 can store different data blocks for a same LBA. For example, both the root node 402 and the leaf node 412 are storing data blocks for LBAs 18 and 19. These data blocks at the two different nodes can be different values that were stored at different times (two different write operations at different times for the same LBA). In some embodiments, the most recent data block for an LBA is the data block stored in the highest node in the data structure 400. Therefore, in this example, the data blocks stored in the LBAs in the root node 402 can be considered the most recent (and thus the valid) values.

Figure 5:
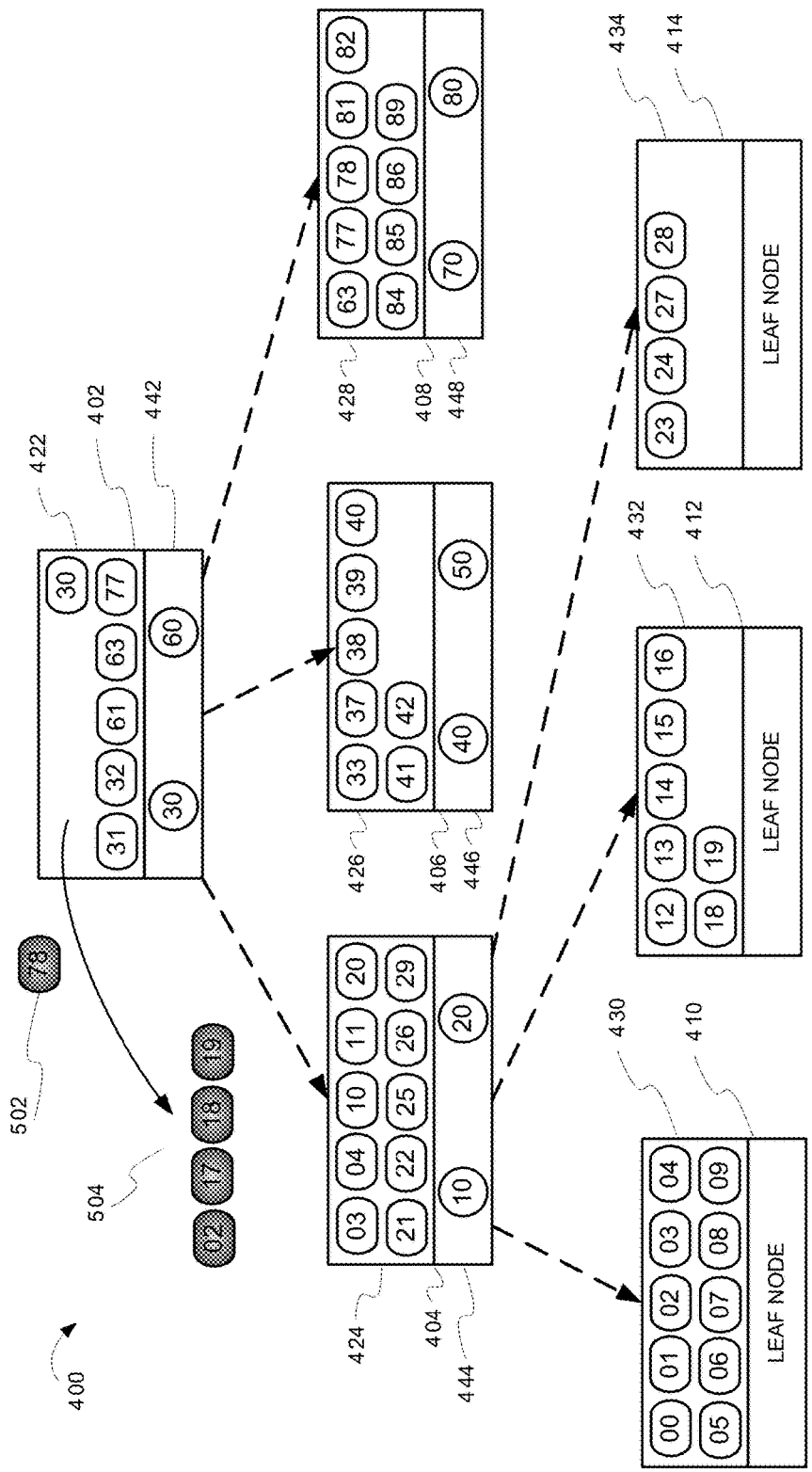

FIG. 5 depicts the data structure 400 at a next point in time relative to the data structure depicted in FIG. 4. In FIG. 5, the translation module 104 begins traversal of the data structure 400 at the root node 402 to find a location in the data structure 400 for the data block having an LBA of 78 (see 502). As shown in FIG. 4, the root node 402 was full. Therefore, one or more of the data blocks need to be flushed to lower nodes to allow for storage of the new data block having the LBA of 78. In this example, data blocks having LBAs of less than 30 (e.g., 02, 17, 18, and 19, corresponding to the values associated with the first child pointer) are flushed to the non-leaf node 404 (see 504).

Figure 6:
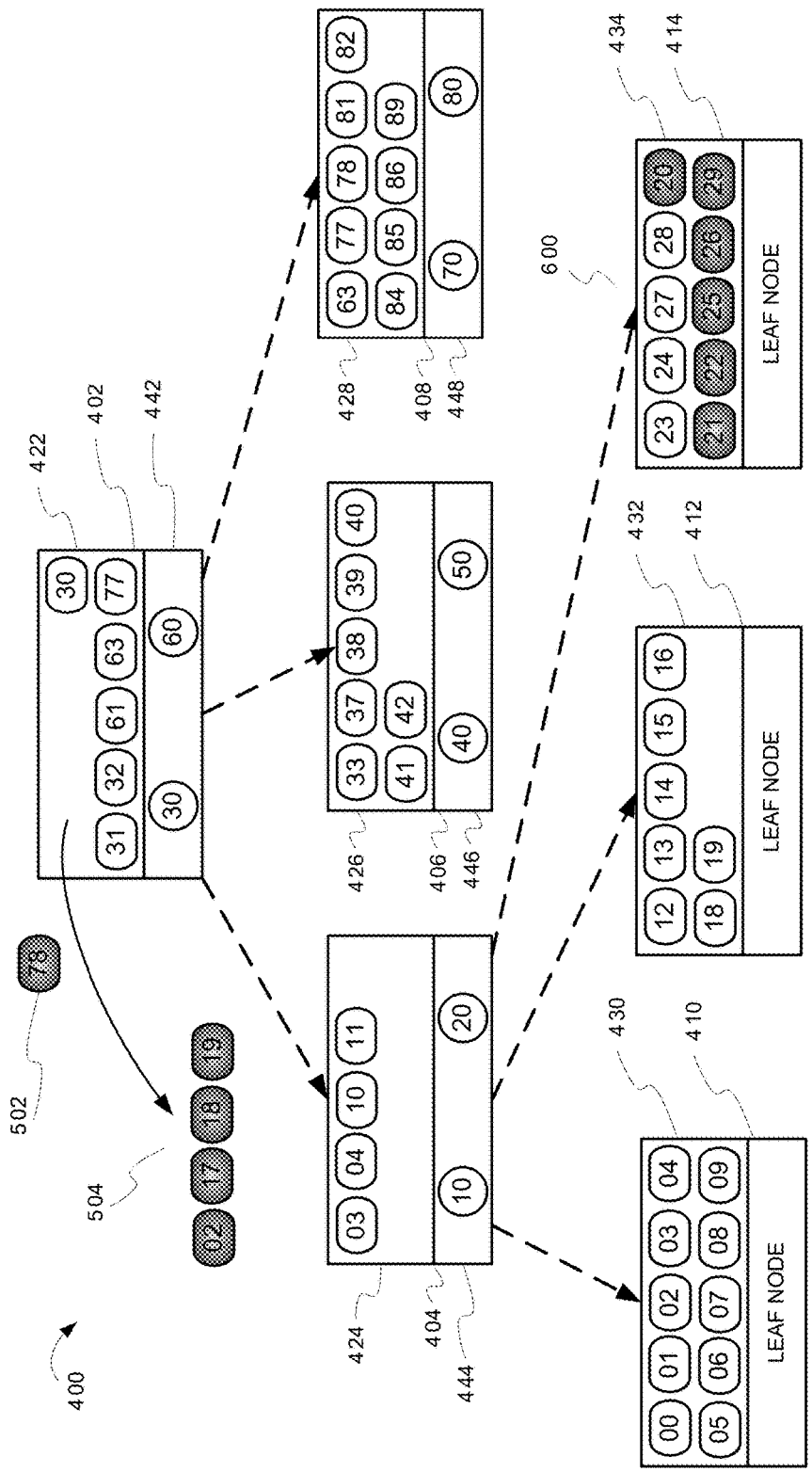

FIG. 6 depicts the data structure 400 at a next point in time relative to the data structure depicted in FIG. 5. As shown in FIG. 5, the non-leaf node 404 was full. Therefore, one or more of the data blocks need to be flushed to lower nodes to allow for storage of the new data blocks having the LBAs of 02, 17, 18, and 19. In this example, data blocks having LBAs of 20 or greater (e.g., 20, 21, 22, 25, 26, and 29, corresponding to the values associated with the second child pointer) are flushed to the leaf node 414 (see 600).

Figure 7:
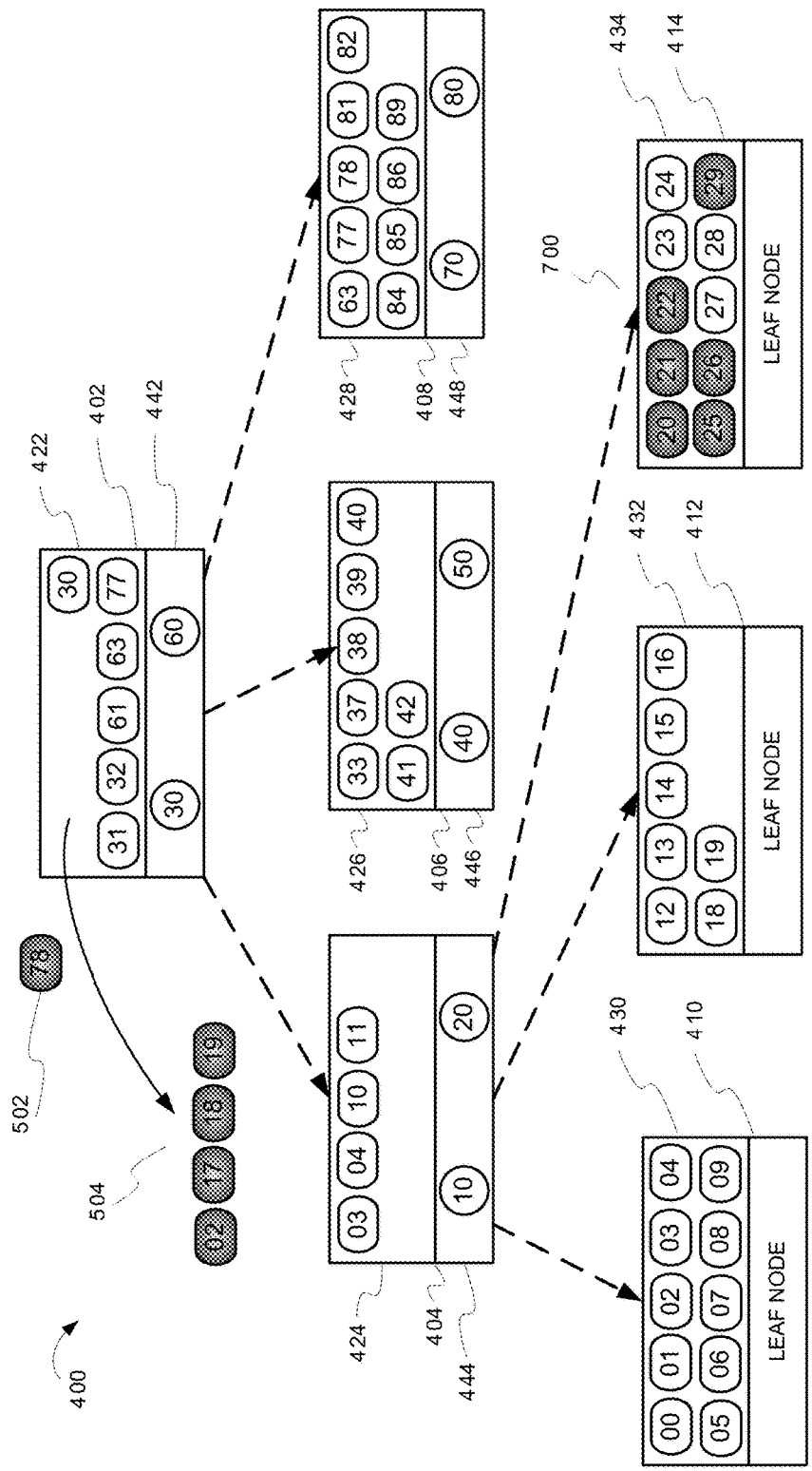

FIG. 7 depicts the data structure 400 at a next point in time relative to the data structure depicted in FIG. 6. As shown, the data blocks in the leaf node 414 are then sequentially ordered based on their associated LBAs (see 700). The ordering of the data blocks in the leaf node 414 changes to the following: 20, 21, 22, 23, 24, 25, 26, 27, 28, and 29.

Figure 8:
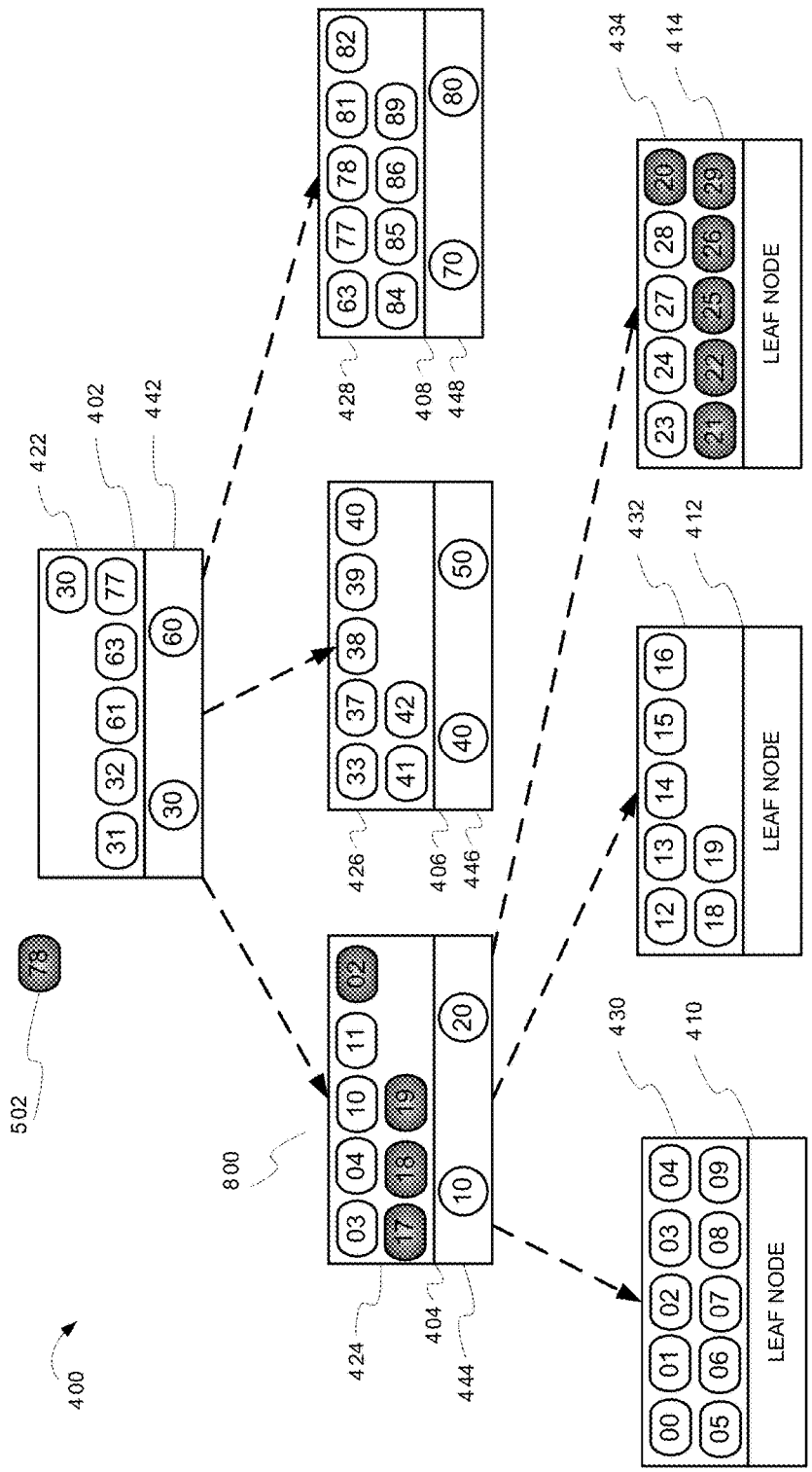

FIG. 8 depicts the data structure 400 at a next point in time relative to the data structure depicted in FIG. 7. As shown, space is now available in the non-leaf node 404. Therefore, the data blocks associated with LBAs 02, 17, 18, and 19 that were flushed from the root node 402 are now stored in the non-leaf node 404 (see 800).

Figure 9:
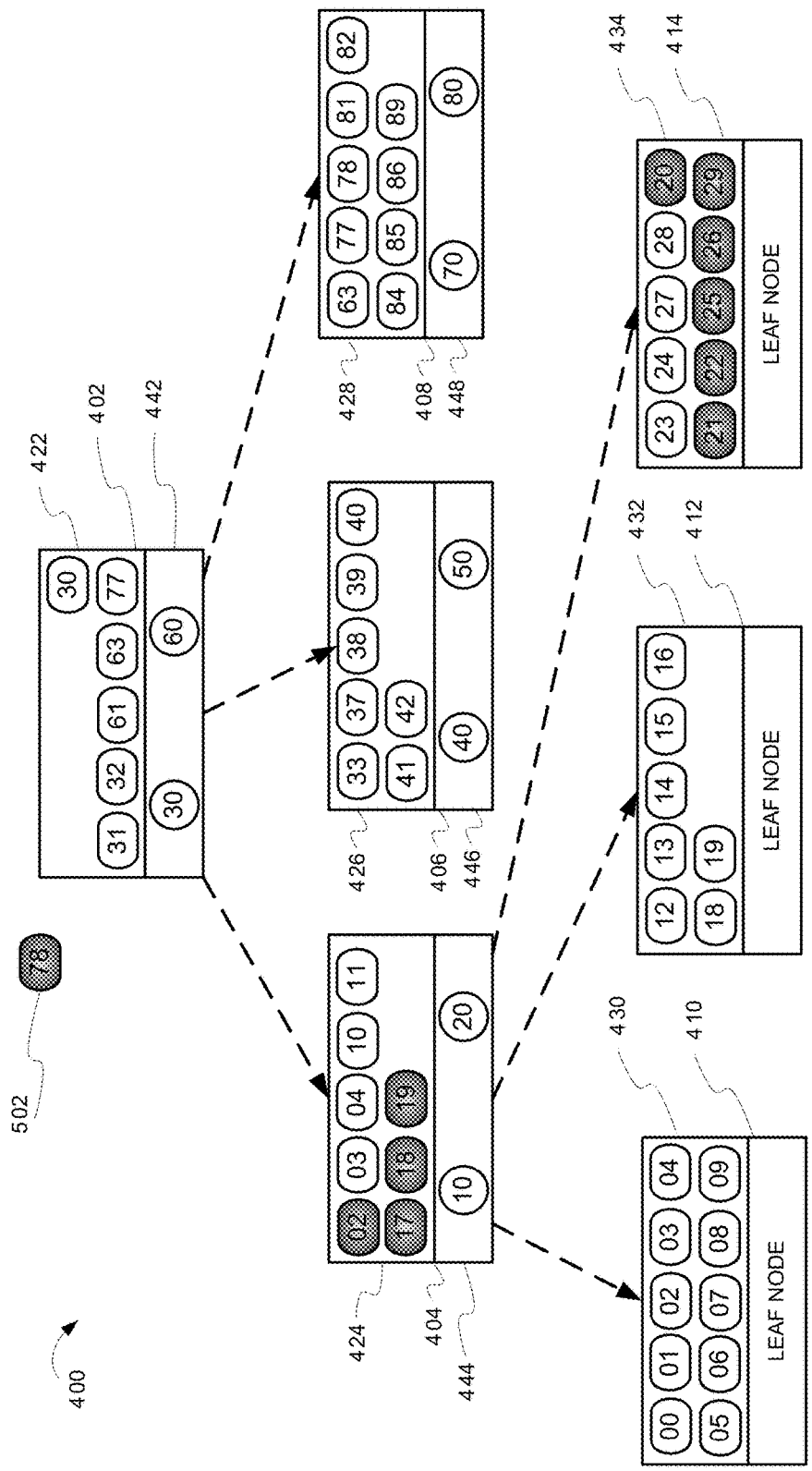

FIG. 9 depicts the data structure 400 at a next point in time relative to the data structure depicted in FIG. 8. As shown, the data blocks in the non-leaf node 404 are then sequentially ordered based on their associated LBAs (see 900). The ordering of the data blocks in non-leaf node 404 changes to the following: 02, 03, 04, 10, 11, 17, 18, and 19.

The position in the data structure is located based on the LBA of the data block and the sequential ordering of the data blocks in the data structure. With reference to the example in FIG. 9, the data block having an LBA of 78 can be stored in the root node 402 based on sequential ordering of the LBAs of data blocks stored in the root node 402. In this example, the translation module 104 can store this data block at the end of the data buffer 422 since its LBA is the largest relative to LBAs of other data blocks stored in the root node 402.

With reference to FIG. 10, the data structure 400 is shown at a next point in time relative to the data structure depicted in FIG. 9. As shown, the data block having an LBA of 78 is stored in the root node 402 (see 1000). In this example, the initial placement of this new data block at the end of the data buffer 422 is the correct position based on sequential ordering. Therefore, no re-ordering of the data blocks is needed in this example.

An update to a node can include adding, removing or arranging data stored therein. Therefore, for the example depicted in FIGS. 4-10, three different nodes were updated. A new updated node is needed for the root node 402 because the data blocks having LBAs of 02, 17, 18, and 19 were removed and the data block having an LBA of 78 was added. A new updated node is needed for the non-leaf node 404 because the data blocks having LBAs of 20, 21, 22, 25, 26, and 29 were removed and the data blocks having LBAs of 02, 17, 18, and 19 were added. Also, the data blocks in the non-leaf node 404 were rearranged to provide for proper sequential ordering. A new updated node is needed for the leaf node 414 because the data blocks having LBAs of 20, 21, 22, 25, 26, and 29 were added. Also, the data blocks in the leaf node 414 were rearranged to provide for proper sequential ordering.

At least some of the operations depicted in FIGS. 3-10 may be performed at least partially in parallel. For example, some of the movement of the data between different nodes of the data structure can be performed at least partially in parallel. Also, the flushing of the data to lower nodes in the data structure can vary from the example depicted in FIGS. 4-10. For example, other and/or less data can be flushed to the lower nodes in accordance with the child pointers. To illustrate, instead of flushing the data blocks having LBAs of 02, 17, 18, and 19 to the non-leaf node 404, the data blocks having LBAs of 30, 31, and 32 could be flushed to the non-leaf node 406. Also, while depicted as having three child pointers, the fanout can be a lesser or greater value.

Also, while the data in a node is depicted as sequentially ordered based on associated LBAs, in some other embodiments, the data that are close in LBA space (though not necessarily sequentially ordered) can be stored in a same node. For example, for a given level of the tree, node A would store data having LBAs with a range of 1-10, node B would store data having LBAs with a range of 11-20, and node C would store data having LBAs with a range of 21-30. For this example, the data in each of nodes A, B, and C would be in their defined ranges but may or may not be sequentially ordered within the given node.

Additionally, while depicted as a standard $B^e$ tree, the nodes of the data structure 114 do not necessarily need to be dynamically added and removed. Rather, because the range of possible keys can be predetermined (i.e., the range of legal LBAs), the shape of the data structure 114 can be precomputed at the time the system 100 is initialized. Accordingly, the data structure 114 can be preconfigured to have a defined number of levels, node sizes, fanout, pivot values, etc. based on the range of legal LBAs.

Example Read/Search Operations

Figure 11:
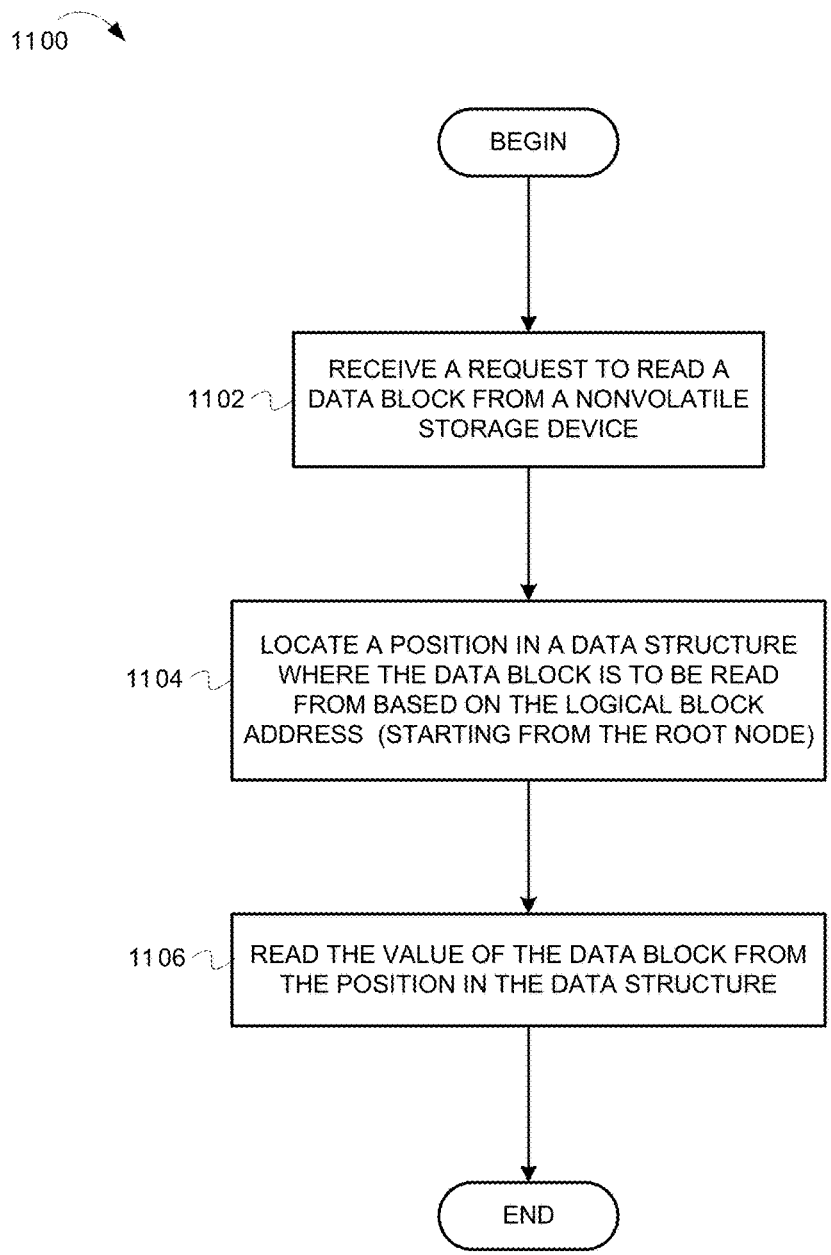
FIG. 11 depicts a flowchart for a sequenced ordered translation to read a data block from a nonvolatile storage device, according to some embodiments.

FIG. 11 depicts a flowchart for a sequenced ordered translation to read a data block from a nonvolatile storage device, according to some embodiments. A flowchart 1100 of FIG. 4 is described in reference to traversal of the on-disk data structure depicted in FIGS. 12-15. The operations of the flowchart 1100 can be performed by software, firmware, hardware or a combination thereof (see for example the translation module 104 in FIGS. 1-2). The operations of the flowchart 1100 start at block 1102.

At block 1102, a request to read a data block from a nonvolatile storage device is received. With reference to FIG. 1, the translation module 104 can receive a data block request 110 from the filesystem 102. The read request can include the Logical Block Address (LBA) from where data is to be read. The read request can also include a range of LBAs to allow for a read of multiple data blocks over a range of LBAs. Operations of the flowchart 1100 continue at block 1104.

At block 1104, a position in the data structure is located where a value of the data block is stored based on the LBA. With reference to FIG. 1, the translation module 104 can locate the position in the data structure. FIGS. 12-15 (which are described below) include examples of traversals of an on-disk data structure to locate the position in the data structure. Operations of the flowchart 1100 continue at block 1106.

At block 1106, the value of the data block is read from the position in the data structure. With reference to FIG. 1, the translation module 104 can read the values from the data blocks at the position located in the data structure. The translation module 104 can then return the value to the filesystem 102 that requested the read operation. Operations of the flowchart 1100 are complete.

Figure 12:
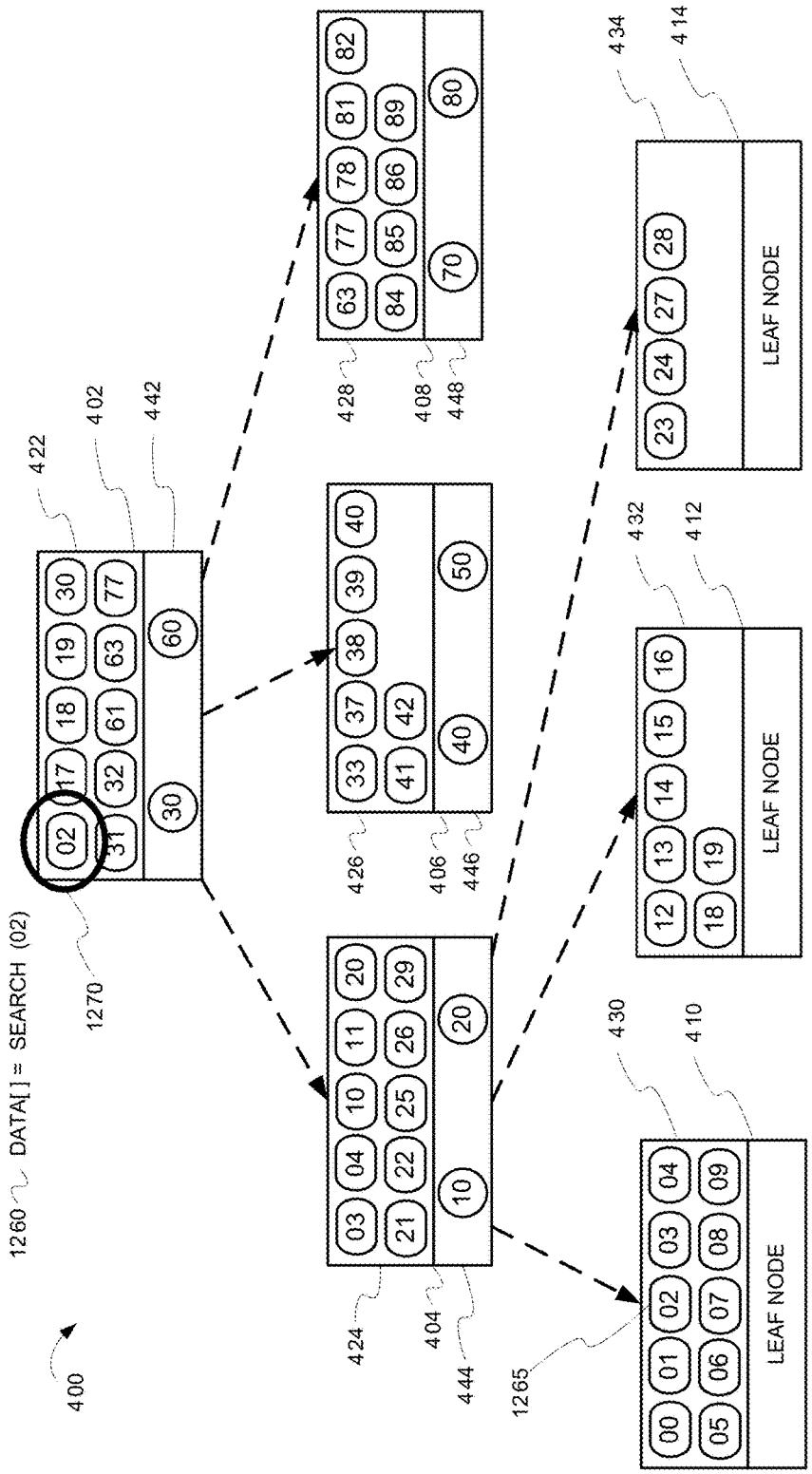
FIG. 12 depicts a first example of a traversal of an on-disk data structure to read a data block from a nonvolatile storage device, according to some embodiments.
Figure 13:
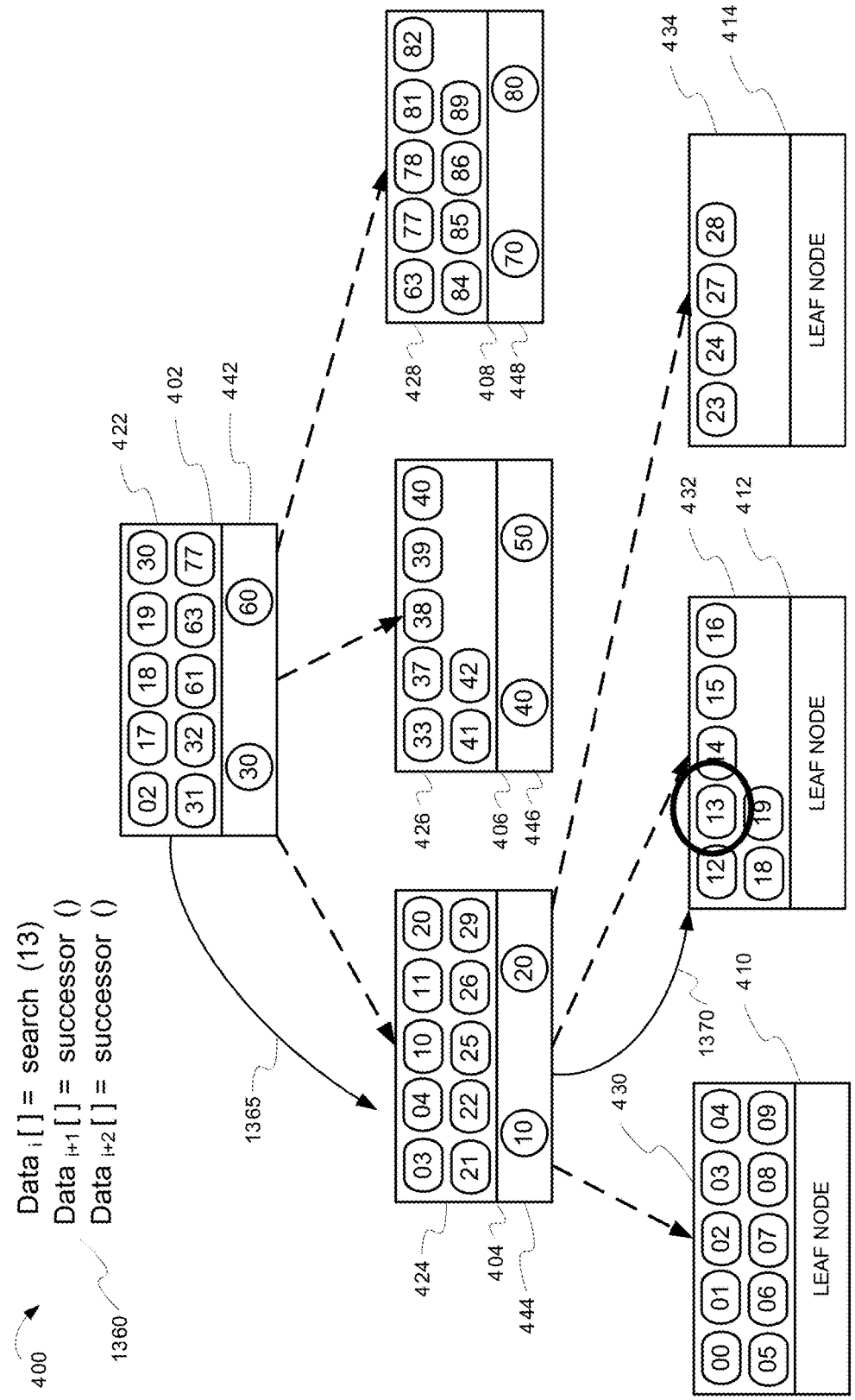
FIGS. 13-15 depict a second example of a traversal of an on-disk data structure to read a data block from a nonvolatile storage device, according to some embodiments.
Figure 14:
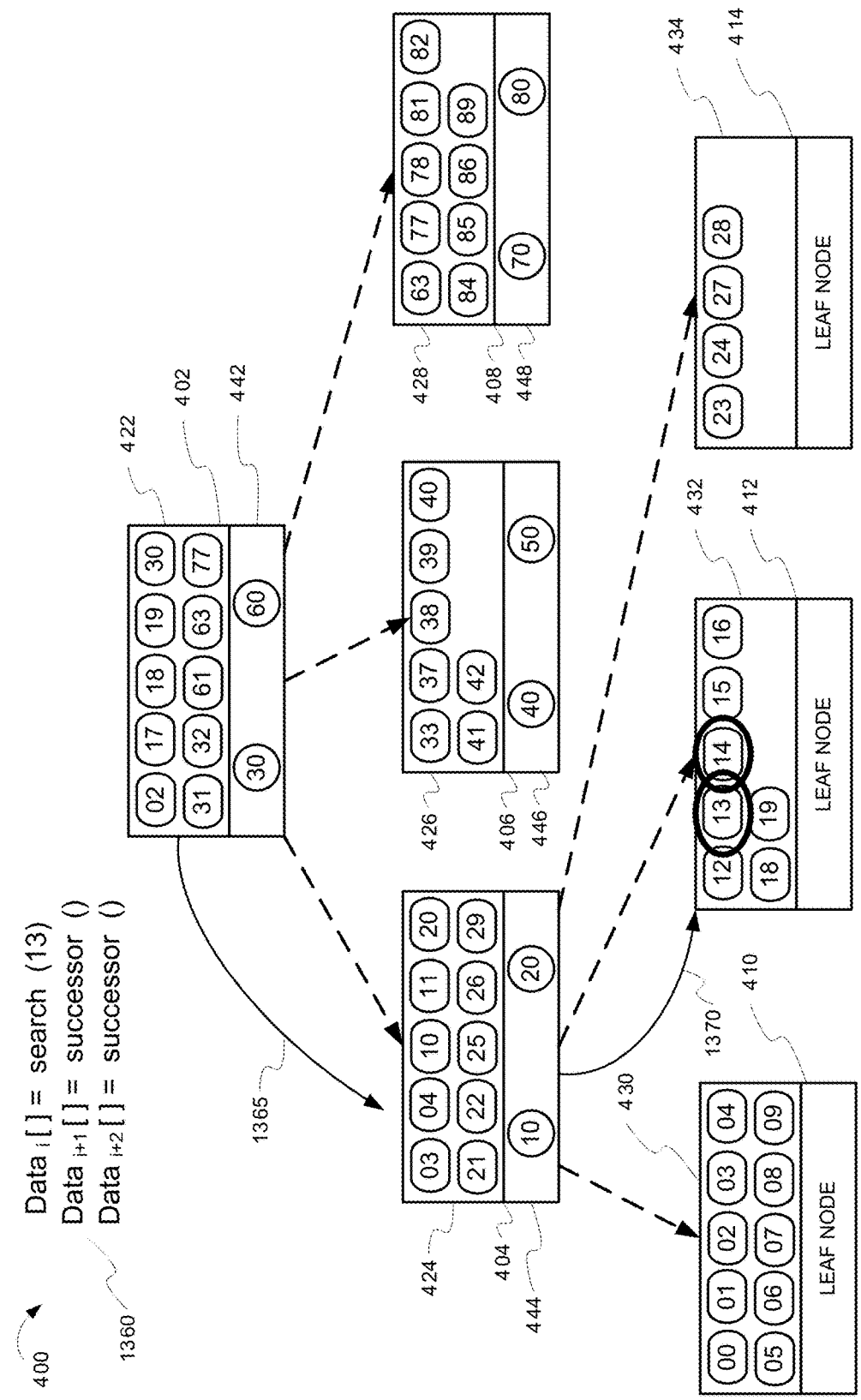
Figure 15:
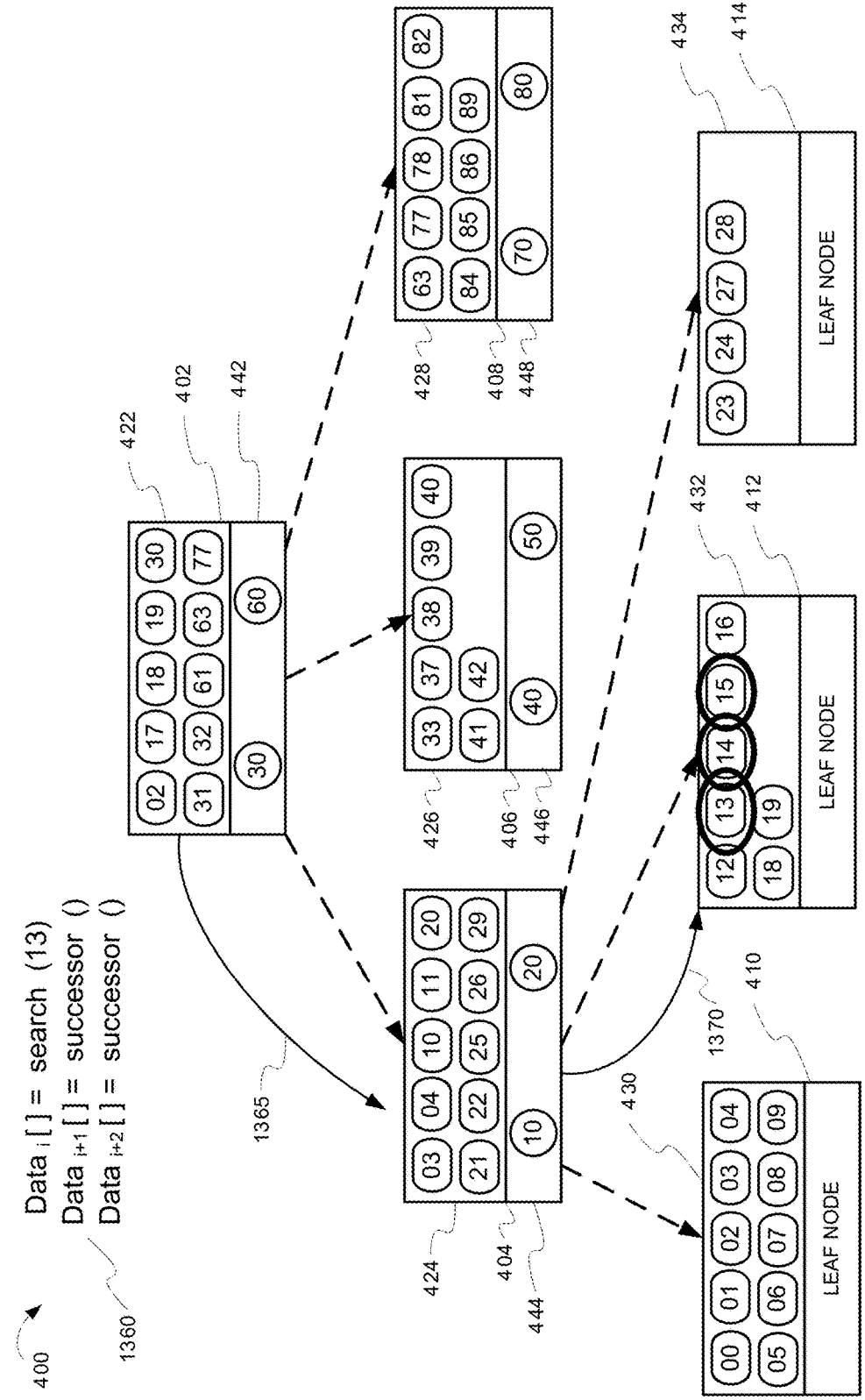

To help illustrate, FIG. 12 depicts a first example of a traversal of an on-disk data structure to read a data block from a nonvolatile storage device, according to some embodiments. FIGS. 13-15 depict a second example of a traversal of an on-disk data structure to read a data block from a nonvolatile storage device, according to some embodiments.

With reference to FIG. 12, the translation module 104 executes a read operation (1260) to locate a value stored at LBA 02. FIG. 12 depicts the data structure 400 of FIG. 4 (as described above). The search to locate the value associated with LBA 02 begins at the root node 402 of the data structure 400. Multiple versions of a data block can be associated with a same LBA. In some embodiments, the most recent (and therefore the valid) version is the version that is at the highest level in the data structure 400. In this example, two data blocks associated with LBA 02 are both stored in the data structure 400. A first data block associated with LBA 02 is stored in the root node 402 (see 1270). A second data block associated with LBA 02 is stored in the leaf node 410 (see 1265). The translation module 140 begins a search for LBA 02 at the root node 402 (because the most recent version is version at a highest level in the data structure 400). Therefore, in this example, the translation module 140 locates the data block associated with LBA 02 at the root node 402.

FIGS. 13-15 depict a second example of traversal of the data structure 400. With reference to FIG. 13, the translation module 104 executes a read operation (1360) to locate a value stored in a data block associated with LBA 13 and to read the two successive data blocks after the data block associated with LBA. The translation module 104 does not find a data block associated with LBA 13 at the root node 402. The translation module 104 then moves down to search the nodes at the next level. In this example, the child pointers 442 of the root node 402 map LBAs less than 30 to the non-leaf node 404. Therefore, the translation module 104 next searches for the data block associated with LBA 13 in the non-leaf node 404 (see 1365). The translation module 104 does not find a data block associated with LBA 13 at the non-leaf node 404. The translation module 104 then moves down to search the nodes at the next level.

The child pointers 444 of the non-leaf node 404 map LBAs between 10 and 20 to the leaf node 412. Therefore, the translation module 104 next searches for the data block associated with LBA 13 in the leaf node 412 (see 1370). The translation module 104 finds a data block associated with LBA 13 at the leaf node 412.

FIG. 14 depicts a continuation of the second example from FIG. 13. As described above, the read request includes reading the two successive data blocks after the data block associated with LBA 13. Therefore, the translation module 104 then finds the successive data block after LBA 13. In this case, the translation module 104 finds the data block associated with LBA 14. FIG. 15 depicts a continuation of the second example from FIG. 14. The translation module 104 finds the second successive data block after LBA 13. In this case, the translation module 104 finds the data block associated with LBA 15.

Example Computer Device

Figure 16:
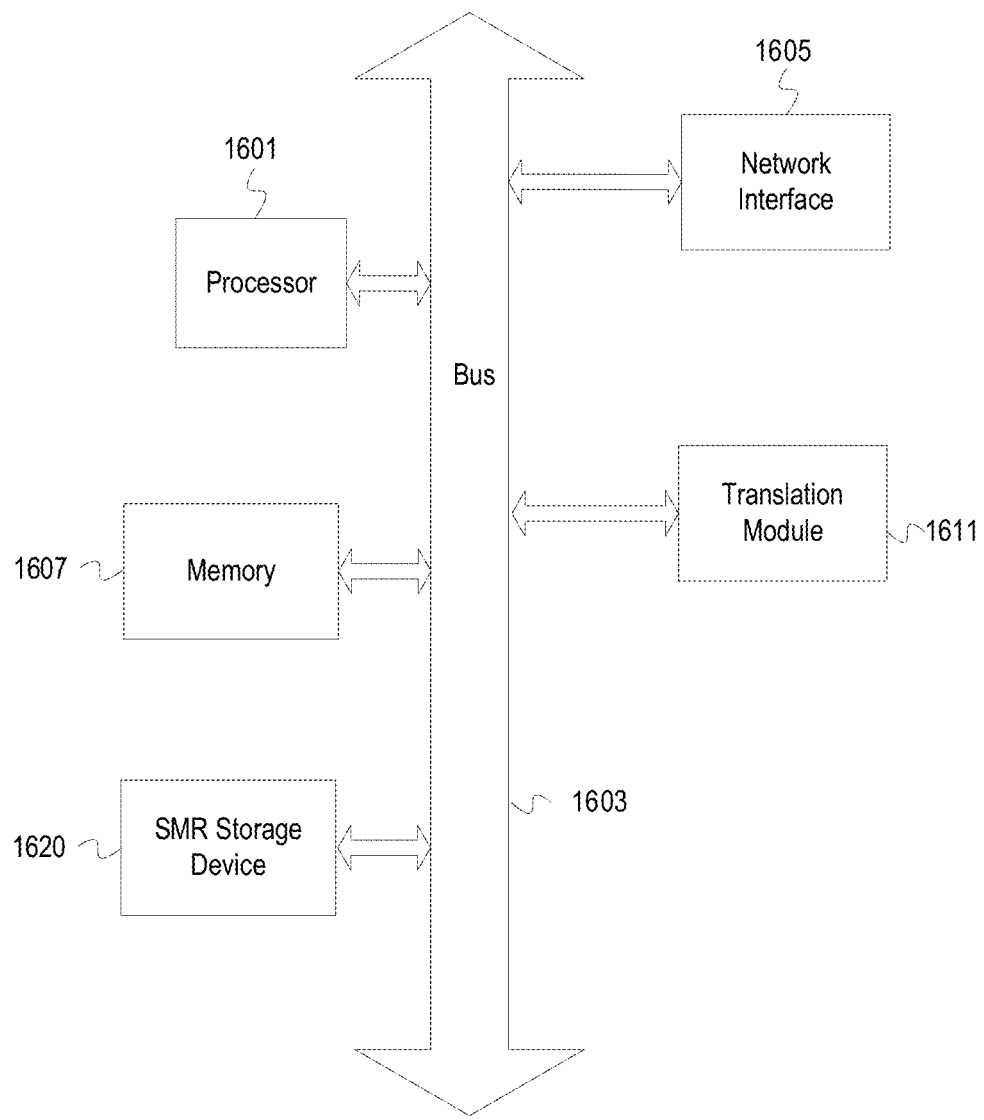
FIG. 16 depicts an example computer device, according to some embodiments.

FIG. 16 depicts an example computer device, according to some embodiments. The computer device includes a processor 1601 (possibly including multiple processors, multiple cores, multiple nodes, and/or implementing multi-threading, etc.). The computer device includes memory 1607. The memory 1607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. For example, the memory 1607 can represent the volatile memory 120 and the nonvolatile memory 106 depicted in FIGS. 1-2.

The computer device also includes an SMR storage device 1620. The SMR storage device 1620 can represent the SMR storage device 108 depicted in FIGS. 1-2. Thus, the SMR storage device 1620 can be an SMR-based magnetic storage device. The SMR storage device 1620 can also include other types of storage devices. For example, the SMR storage device 1620 can be a nonvolatile FLASH device. Alternatively or in addition, the SMR storage device 1620 may not be limited to SMR-based writes. For example, some embodiments may be incorporated into any other storage devices configured to store on-disk data structures to provide for sequential ordering of data blocks stored therein based on the associated LBAs of the data blocks.

The computer device also includes a bus 1603 (e.g., PCI, ISA, PCI-Express, HyperTransport® bus, InfiniBand® bus, NuBus, etc.) and a network interface 1605 (e.g., a Fiber Channel interface, an Ethernet interface, an internet small computer system interface, SONET interface, wireless interface, etc.). The computer device also includes a translation module 1611. The translation module 1611 can perform the translation operations as described above for accessing data from the SMR storage device 1620. Any one of the previously described functionalities may be partially (or entirely) implemented in hardware and/or on the processor 1601. For example, the functionality may be implemented with an application specific integrated circuit, in logic implemented in the processor 1601, in a co-processor on a peripheral device or card, etc. Further, realizations may include fewer or additional components not illustrated in FIG. 16 (e.g., video cards, audio cards, additional network interfaces, peripheral devices, etc.). The processor 1601 and the network interface 1605 are coupled to the bus 1603. Although illustrated as being coupled to the bus 1603, the memory 1607 may be coupled to the processor 1601.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted for movement of data blocks between nodes of the data structure can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for sequenced-ordered translation for data storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
based on receipt of a first write request that indicates a first logical block address and a first data block to write to a nonvolatile storage device, inserting the first logical block address and the first data block as a first key-value pair into a hierarchical tree structure that comprises a plurality of nodes, each of which includes a buffer,
wherein inserting the first key-value pair into the hierarchical tree structure comprises,
identifying a first node of the hierarchical tree structure for the first key-value pair based on the first logical block address;
based on a determination that a buffer of the first node is full, flushing a first set of one or more key-value pairs into a first lower level node from the buffer of the first node;
writing the first key-value pair into the buffer of the first node of the hierarchical tree structure, wherein the hierarchical tree structure maintains key-value pairs in each buffer in order by the keys; and
based on storing the first node on the nonvolatile storage device, updating a node translation table to associate a first node identifier that identifies the first node with a corresponding location on the nonvolatile storage device.

2. The method of claim 1, wherein the nonvolatile storage device comprises a Shingled Magnetic Recording (SMR) storage device.

3. The method of claim 1, wherein at least part of the hierarchical tree structure comprises an on-disk data structure stored in the nonvolatile storage device.

4. The method of claim 1, further comprising:
determining that the first node is an existing node on the nonvolatile storage device and reading the first node from a first zone in the nonvolatile storage device into a cache for the hierarchical tree structure, wherein flushing the first set of one or more key-value pairs from the buffer of the first node and writing the first key-value pair into the buffer of the first node comprises flushing the first set of one or more key-value pairs from the buffer of the first node in the cache and writing the first key-value pair into the buffer of the first node in the cache;
after flushing and writing, storing the first node from the cache into a second zone in the nonvolatile storage device or at the end of the first zone in the nonvolatile storage device; and
marking the first node in the first zone in the nonvolatile storage device that was read from the first zone for garbage collection.

5. The method of claim 1 further comprising storing the first node to an open zone of the nonvolatile storage device based on an eviction policy that governs a cache for the hierarchical tree structure, wherein a subset of the plurality of nodes reside in the cache and the plurality of nodes reside in the nonvolatile storage device.

6. The method of claim 1, wherein the first set of one or more key-value pairs are flushed based, at least in part, on fanout and pivot values of the hierarchical tree structure.

7. The method of claim 1, wherein the hierarchical tree structure is based on a BE tree.

8. The method of claim 1 further comprising recording changes to the hierarchical tree structure in a log.

9. The method of claim 1 further comprising maintaining a map that indicates which nodes are active and which are marked for garbage collection.

10. The method of claim 1, wherein flushing the first set of one or more key-value pairs into a first lower level node from the buffer of the first node comprises creating the first lower level node and inserting the first set of one or more key-value pairs into the created first lower level node.

11. One or more non-transitory machine-readable media having stored therein program code for buffering writes to nonvolatile storage in a hierarchical tree structure, wherein the program code comprises instructions to:
based on receipt of a first write request that indicates a first logical block address and a first data block to write to a nonvolatile storage device, insert the first logical block address and the first data block as a first key-value pair into the hierarchical tree structure that comprises a plurality of nodes, each of which includes a buffer,
wherein the instructions to insert the first key-value pair into the hierarchical tree structure comprises instructions to,
identify a first node of the hierarchical tree structure for the first key-value pair based on the first logical block address;
based on a determination that a buffer of the first node is full, flush a first set of one or more key-value pairs into a first lower level node from the buffer of the first node;
write the first key-value pair into the buffer of the first node of the hierarchical tree structure, wherein the hierarchical tree structure maintains key-value pairs in each buffer in order by the keys; and
based on storing the first node on the nonvolatile storage device, update a node translation table to associate a first node identifier that identifies the first node with a corresponding location on the nonvolatile storage device.

12. The non-transitory machine-readable media of claim 11, wherein at least part of the hierarchical tree structure comprises an on-disk data structure stored in the nonvolatile storage device.

13. The non-transitory machine-readable media of claim 11, further comprising:
- determining that the first node is an existing node on the nonvolatile storage device and reading the first node from a first zone in the nonvolatile storage device into a cache for the hierarchical tree structure, wherein flushing the first set of one or more key-value pairs from the buffer of the first node and writing the first key-value pair into the buffer of the first node comprises flushing the first set of one or more key-value pairs from the buffer of the first node in the cache and writing the first key-value pair into the buffer of the first node in the cache;
- after flushing and writing, storing the first node from the cache into a second zone in the nonvolatile storage device or at the end of the first zone in the nonvolatile storage device; and
- marking the first node in the first zone in the nonvolatile storage device that was read from the first zone for garbage collection.

14. The non-transitory machine-readable media of claim 11 further comprising instructions to store the first node to an open zone of the nonvolatile storage device based on an eviction policy that governs a cache for the hierarchical tree structure, wherein a subset of the plurality of nodes reside in the cache and the plurality of nodes reside in the nonvolatile storage device.

15. The non-transitory machine-readable media of claim 11, wherein the first set of one or more key-value pairs are flushed based, at least in part, on fanout and pivot values of the hierarchical tree structure.

16. The non-transitory machine-readable media of claim 11, wherein the hierarchical tree structure is based on a $B^\epsilon$ tree.

17. The non-transitory machine-readable media of claim 11 further comprising maintaining a map that indicates which nodes are active and which are marked for garbage collection.

18. The non-transitory machine-readable media of claim 11, wherein flushing the first set of one or more key-value pairs into a first lower level node from the buffer of the first node comprises creating the first lower level node and inserting the first set of one or more key-value pairs into the created first lower level node.

19. An apparatus comprising:
a processor;
a nonvolatile storage device; and
a machine-readable medium having program code stored therein, the program code executable by the processor to cause the apparatus to,
based on receipt of a first write request that indicates a first logical block address and a first data block to write to the nonvolatile storage device, insert the first logical block address and the first data block as a first key-value pair into the hierarchical tree structure that comprises a plurality of nodes, each of which includes a buffer,
wherein the program code to insert the first key-value pair into the hierarchical tree structure comprises program code executable by the processor to cause the apparatus to,
- identify a first node of the hierarchical tree structure for the first key-value pair based on the first logical block address;
- based on a determination that a buffer of the first node is full, flush a first set of one or more key-value pairs into a first lower level node from the buffer of the first node;
- write the first key-value pair into the buffer of the first node of the hierarchical tree structure, wherein the hierarchical tree structure maintains key-value pairs in each buffer in order by the keys; and
based on storing the first node on the nonvolatile storage device, update a node translation table to associate a first node identifier that identifies the first node with a corresponding location on the nonvolatile storage device.

20. The apparatus of claim 19, wherein the machine-readable medium further comprises program code executable by the processor to cause the apparatus to store the first node to an open zone of the nonvolatile storage device based on an eviction policy that governs a cache for the hierarchical tree structure, wherein a subset of the plurality of nodes reside in the cache and the plurality of nodes reside in the nonvolatile storage device.

* * * * *